United States Patent
Kumabe (10) Patent No.: US 10,257,661 B2
(45) Date of Patent: Apr. 9, 2019

(54) VEHICULAR COMMUNICATION DEVICE

(71) Applicant: DENSO CORPORATION, Kariya, Aichi-pref. (JP)

(72) Inventor: Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 58 days.

(21) Appl. No.: 15/545,829

(22) PCT Filed: Jan. 28, 2016

(86) PCT No.: PCT/JP2016/000436
§ 371 (c)(1),
(2) Date: Jul. 24, 2017

(87) PCT Pub. No.: WO2016/125468
PCT Pub. Date: Aug. 11, 2016

(65) Prior Publication Data
US 2018/0020332 A1    Jan. 18, 2018

(30) Foreign Application Priority Data
Feb. 3, 2015  (JP) .................................. 2015-019512

(51) Int. Cl.
*G08G 1/16* (2006.01)
*H04W 4/44* (2018.01)
(Continued)

(52) U.S. Cl.
CPC ............ *H04W 4/04* (2013.01); *G06F 21/305* (2013.01); *G08G 1/096783* (2013.01);
(Continued)

(58) Field of Classification Search
CPC .. G08G 1/096; G08G 1/095; G08G 1/096716; G08G 1/096783; G08G 1/07;
(Continued)

(56) References Cited

U.S. PATENT DOCUMENTS 8,928,468 B2 * 1/2015 Ullrich .................. G08G 1/161
340/425.5
9,426,139 B1 * 8/2016 McClintock ............ H04L 63/08
(Continued)

FOREIGN PATENT DOCUMENTS

| JP | 2007048302 A | 2/2007 |
|----|---|---|
| WO | WO-2003077071 A2 | 9/2003 |
| WO | WO-2012014041 A1 | 2/2012 |

OTHER PUBLICATIONS

U.S. Appl. No. 15/545,846, filed Jul. 24, 2017, Kumabe.
U.S. Appl. No. 15/545,856, filed Jul. 24, 2017, Kumabe.

*Primary Examiner* — Mark S Blouin
(74) *Attorney, Agent, or Firm* — Harness, Dickey & Pierce, P.L.C.

(57) ABSTRACT

A vehicular communication device is provided. The vehicular communication device includes a reception section that, from a periphery vehicle equipped with a wide area communicator, receives a communication performance index representing performance of the wide area communicator, and a controller. The controller includes a reference value setup section that successively settles a reference value as a criterion based on the communication performance indexes received from multiple periphery vehicles, an acquisition section that acquires the communication performance index for a targeted wide area communicator which is the wide area communicator targeted at anomaly determination, and an anomaly determination section that determines an anomaly of the targeted wide area communicator based on comparison between the reference value settled by the reference value setup section and the communication performance index acquired by the acquisition section for the targeted wide area communicator.

8 Claims, 6 Drawing Sheets

(51) Int. Cl.
  *H04W 4/46*   (2018.01)
  *G06F 21/30*  (2013.01)
  *H04W 24/08*  (2009.01)
  *H04W 88/02*  (2009.01)
  *G08G 1/0967* (2006.01)
  *H04W 4/04*   (2009.01)

(52) U.S. Cl.
  CPC ........ *G08G 1/096791* (2013.01); *H04W 4/44* (2018.02); *H04W 24/08* (2013.01); *H04W 88/02* (2013.01); *B60W 2550/40* (2013.01); *G06F 2221/2101* (2013.01); *G06F 2221/2115* (2013.01); *G08G 1/096716* (2013.01); *G08G 1/096758* (2013.01); *G08G 1/162* (2013.01); *G08G 1/164* (2013.01); *H04W 4/46* (2018.02)

(58) Field of Classification Search
  CPC ......... G08G 1/09675; G08G 1/096758; G08G 1/161; G08G 1/164
  USPC ....................................................... 340/930
  See application file for complete search history.

(56) References Cited

U.S. PATENT DOCUMENTS

| | | | |
|---|---|---|---|
| 10,020,844 B2 * | 7/2018 | Bogdan | ................... H04L 67/26 |
| 2009/0323772 A1 | 12/2009 | Sanji et al. | |
| 2013/0124064 A1 * | 5/2013 | Nemoto | ............. B60K 31/0058 |
| | | | 701/96 |

* cited by examiner

VEHICULAR COMMUNICATION DEVICE

CROSS REFERENCE TO RELATED APPLICATIONS

This application is a U.S. National Phase Application under 35 U.S.C. 371 of International Application No. PCT/JP2016/000436 filed on Jan. 28, 2016 and published in Japanese as WO 2016/125468 A1 on Aug. 11, 2016. This application is based on and claims the benefit of priority from Japanese Patent Application No. 2015-019512 filed on Feb. 3, 2015. The entire disclosures of all of the above applications are incorporated herein by reference.

TECHNICAL FIELD

The present disclosure relates to a vehicular communication device that determines an anomaly of a wide area communicator.

BACKGROUND ART

Conventionally, there is known a technology that detects anomaly occurring on a device used for vehicles. Patent Literature 1 discloses the technology that uses a shock sensor included in an in-vehicle device to detect anomaly occurring on the in-vehicle device.

Further, there is known a system in which a vehicular communication device wirelessly communicates with devices outside a vehicle to enable a driver of a subject vehicle to use various services (hereinafter referred to as in-vehicle communication services). There is known an in-vehicle communication service, as an example, in which the vehicular communication device includes a wide area communicator that communicates with a server apparatus via a wide area communication network to transmit and receive various types of information.

The information transmitted from the wide area communicator to the server apparatus includes an emergency notification, for example. The information transmitted from the server apparatus to the wide area communicator includes map data, for example.

PRIOR ART LITERATURES

Patent Literature

Patent Literature 1: JP2007-48302A

SUMMARY OF INVENTION

The driver cannot appropriately receive an inter-vehicle communication if a wide area communicator is abnormal when the wide area communicator is used to receive in-vehicle communication services. It is therefore necessary to determine anomaly on the wide area communicator.

The wide area communicator may be determined to be abnormal when the communication performance of the wide area communicator degrades. However, the communication environment of the wide area communicator dynamically changes because the vehicular communication device is used for a vehicle acing as a mobile object. The communication performance of the wide area communicator degrades in a tunnel even though the wide area communicator is not abnormal, for example. The communication performance of the wide area communicator is likely to degrade when the wide area communicator is close to a periphery vehicle mounted with a vehicular communication device or is close to many devices including wide area communicators other than the vehicular communication device in the vicinity. It has been therefore difficult to accurately determine an anomaly on the wide area communicator based only on the communication performance of the wide area communicator.

In consideration of the foregoing, it is an object of the present disclosure to provide a vehicular communication device capable of accurately determining an anomaly of a wide area communicator.

A vehicular communication device used for a vehicle in an aspect of the present disclosure comprises: a reception section that, from a periphery vehicle equipped with a wide area communicator to connect a wide area communication network for performing communication, receives a communication performance index representing performance of the wide area communicator; a reference value setup section that successively settles a reference value as a criterion for the communication performance index based on the communication performance indexes received by the reception section from a plurality of the periphery vehicles; an acquisition section that acquires the communication performance index for a targeted wide area communicator, wherein a targeted wide area communicator is the wide area communicator targeted at anomaly determination; and an anomaly determination section that determines an anomaly of the targeted wide area communicator based on comparison between the reference value settled by the reference value setup section and the communication performance index acquired by the acquisition section for the targeted wide area communicator.

In the vehicular communication device, the reference value setup section sets a reference value based on communication performance indexes acquired from a plurality of periphery vehicles. The reference value therefore varies with an influence of the communication environment when the communication performance of a wide area communicator varies with the influence of the communication environment.

The anomaly determination on a targeted wide area communicator is performed based on comparison between the reference value and the communication performance index for the targeted wide area communicator. It is therefore possible to accurately distinguish between the case where the communication performance index for the targeted wide area communicator is abnormal due to an anomaly of the targeted wide area communicator and the case where the targeted wide area communicator is not abnormal but the communication performance index for the targeted wide area communicator indicates an abnormal value. Anomaly of the targeted wide area communicator can therefore be determined accurately.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION (Overall Configuration of a Communication System 1)

Figure 1:
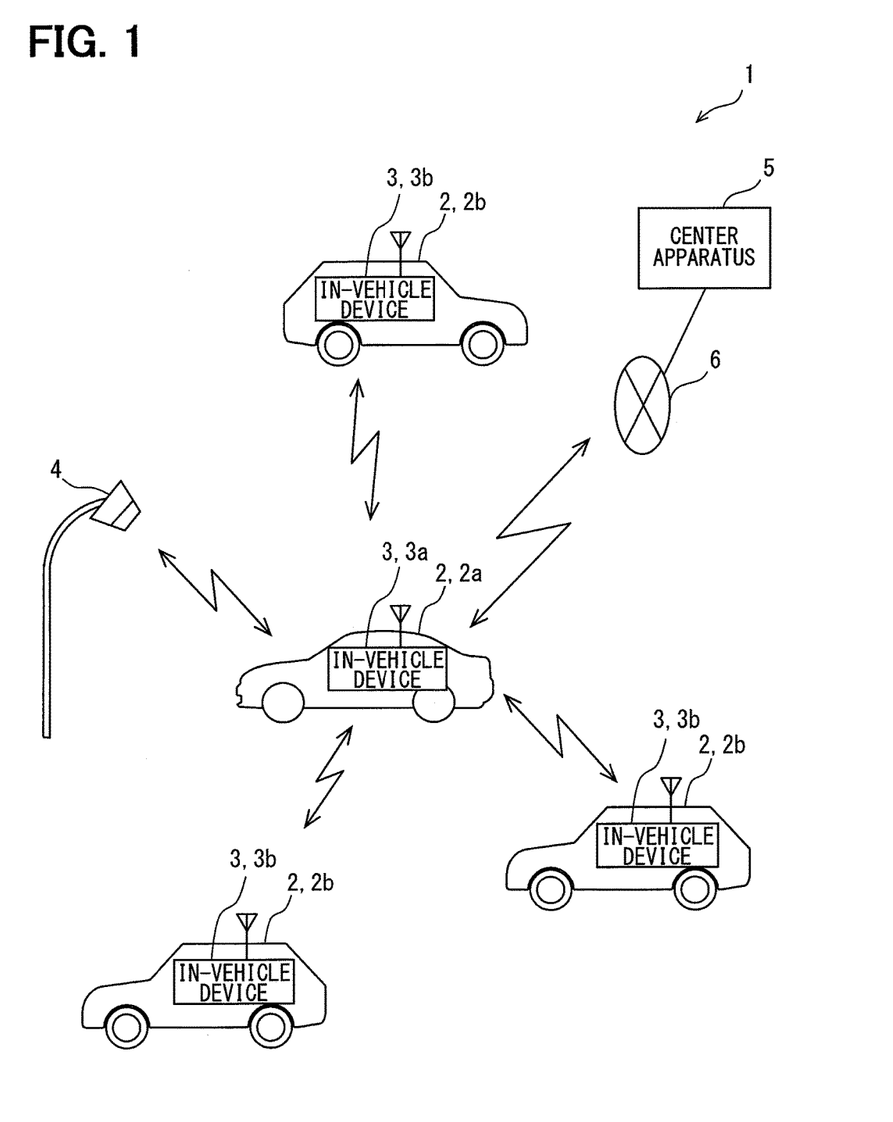
FIG. 1 illustrates an overall configuration of a communication system according to an embodiment.

An embodiment will be described with reference to the accompanying drawings. A communication system 1 as illustrated in FIG. 1 includes: an in-vehicle device 3a used for a subject vehicle 2a; an in-vehicle device 3b used for a periphery vehicle 2b located in the vicinity of the subject vehicle 2a; a roadside device 4 installed at a roadside; and a center apparatus (hereinafter referred to as a center) 5.

The in-vehicle device 3a and the in-vehicle device 3b use the same configuration according to the embodiment. The subject vehicle 2a and the periphery vehicle 2b are therefore distinguished for convenience sake. Any of the vehicles 2 can be the subject vehicle 2a. The periphery vehicle 2b is assumed to be the vehicle 2 that exists in the vicinity of the subject vehicle 2a and uses the in-vehicle device 3. In the description below, the nomenclature of vehicle 2 is simply used when the subject vehicle 2a and the periphery vehicle 2b are not distinguished. The nomenclature of in-vehicle device 3 is simply used when the in-vehicle device 3a and the in-vehicle device 3b are not distinguished. The in-vehicle device 3 corresponds to a vehicular communication device.

The in-vehicle device 3a and the in-vehicle device 3b transmit and receive information by using inter-vehicle communication, namely, wireless communication without using a communication network. The inter-vehicle communication covers a communication range of several hundreds of meters. The in-vehicle device 3 and the roadside device 4 transmit and receive information by using vehicle roadside communication, namely, wireless communication without using a communication network. The in-vehicle device 3 and the center 5 perform wide area communication via a wide area communication network 6.

The roadside device 4 performs the vehicle roadside communication with the in-vehicle device 3 to exchange information about service provision when the in-vehicle device 3 is used for the vehicle 2 that is located in a wireless communication area for the roadside device 4. The wireless communication area for the roadside device 4 can be variously changed depending on service types. The wireless communication area approximates to several tens to hundreds of meters from the roadside device 4, for example.

A center 5 is provided as a server apparatus and receives a notification that is transmitted from an in-vehicle device 3 by using wide area communication. The notification includes an anomaly notification about a wide area communicator 32 (see FIG. 2) included in the in-vehicle device 3b of a periphery vehicle 2b.

(Configuration of the In-Vehicle Device 3)

The configuration of the in-vehicle device 3 will be described. The description below about FIGS. 2 through 6 explains the configuration of the in-vehicle device 3a mounted on the subject vehicle 2a. As above, however, the same configuration is used for the in-vehicle device 3a mounted on the subject vehicle 2a and the in-vehicle device 3b mounted on the periphery vehicle 2b.

The in-vehicle device 3a may be fixed to a member included in the subject vehicle 2a by using a bolt or an adhesive so that the in-vehicle device 3a can hardly be brought out of the subject vehicle 2a. Alternatively, the in-vehicle device 3a may be mounted on the subject vehicle 2a by being fixed to a holder so that the in-vehicle device 3a can be detached from the holder without using a tool. The in-vehicle device 3a is assumed to be normally mounted on the subject vehicle 2a at a dashboard facing a windshield.

Figure 2:
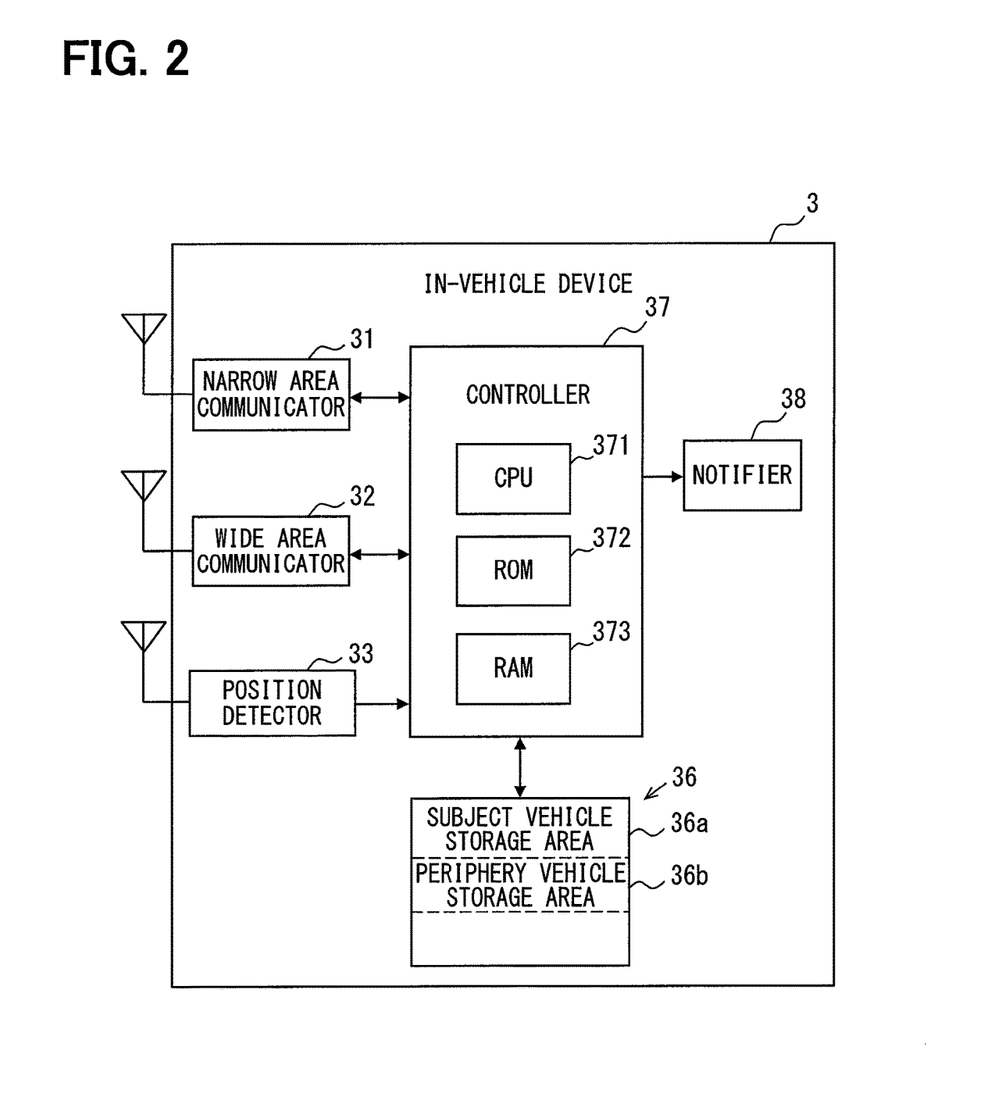
FIG. 2 is a block diagram illustrating a configuration of an in-vehicle device in FIG. 1.

As illustrated in FIG. 2, the in-vehicle device 3 includes a narrow area communicator 31, a wide area communicator 32, a position detector 33, a storage unit 36, a controller 37, and a notifier 38.

The narrow area communicator 31 can be also referred to as an inter-vehicle communicator or a vehicle roadside communicator and communicates with the outside of a subject vehicle 2a by using inter-vehicle communication and vehicle roadside communication. The narrow area communicator 31 covers a communication range comparable to a radius of approximately several hundreds of meters. The narrow area communicator 31 communicates with the in-vehicle device 3b mounted on the periphery vehicle 2b and with a roadside device 4. The narrow area communicator 31 serves as a receiver to receive a communication performance index for the wide area communicator 32 included in the in-vehicle device 3b from the in-vehicle device 3b of the periphery vehicle 2b.

The vicinity in the embodiment signifies the communication range of the narrow area communicator 31. The narrow area communicator 31 modulates and demodulates a received signal and outputs demodulated data to the controller 37. The narrow area communicator 31 modulates data input from the controller 37, converts the data into an electromagnetic wave, and transmits it.

The wide area communicator 32 connects with the wide area communication network 6 to communicate with the center 5 outside the subject vehicle 2a, for example. The wide area communicator 32 demodulates a signal received via the wide area communication network 6 and outputs the signal to the controller 37. The wide area communicator 32 modulates a baseband signal input from the controller 37 and transmits the signal to the center 5.

During communication with the outside, the wide area communicator 32 specifies any one of an RSSI (Received Signal Strength Indication), an average communication rate, a communication success rate, and the number of received error frames as a communication performance index. The communication performance index is predetermined to represent which of these. The communication performance index represents the same one for the different in-vehicle devices 3.

The RSSI is specified based on the electric power of a received electromagnetic. The average communication rate is specified based on the quantity of data received during a specified time. The communication success rate is calculated from the number of frames received during a given time period and the number of successfully decoded frames. The number of received error frames provides the number of frames resulting in errors during a given time, namely, the number of unsuccessfully decoded frames.

The wide area communicator 32 successively outputs the specified communication performance index to the controller 37. The wide area communicator 32 also output telecommunications carrier information along with the communication performance index to the controller 37. The telecommunications carrier information represents a telecommunications carrier that manages a wide area communication network 6 connected to the wide area communicator 32. The telecommunications carrier information is represented by a numeric value associated with the telecommunications carrier, for example.

The position detector 33 includes a GNSS receiver used for GNSS (Global Navigation Satellite System) and successively (e.g., at a given cycle) detects a current position of the subject vehicle 2a based on a positioning signal received from a positioning satellite. The current position is represented in latitude, longitude, and altitude. The position detector 33 successively (e.g., every 100 milliseconds) outputs the detected current position to the controller 37.

In addition, the position detector 33 successively specifies a satellite signal quality index based on a positioning signal received by the GNSS receiver from the positioning satellite. The satellite signal quality index represents C/N (dB) or the number of satellites from which positioning signals are received, for example. The satellite signal quality index corresponds to positioning result information.

The communication performance index is predetermined to specifically represent which of values. The satellite signal quality index represents the same one for the different in-vehicle devices 3. The position detector 33 also successively outputs the specified satellite signal quality index to the controller 37.

The storage unit 36 is writable and includes a subject vehicle storage area 36a and a periphery vehicle storage area 36b. The subject vehicle storage area 36a stores the communication performance index supplied from the wide area communicator 32 to the controller 37 and the satellite signal quality index and the telecommunications carrier information supplied from the position detector 33 to the controller 37. The periphery vehicle storage area 36b stores the communication performance index, the satellite signal quality index, and the telecommunications carrier information received from the periphery vehicle 2b.

The controller 37 is provided as a typical computer including a CPU 371, ROM 372, and RAM 373. The ROM 372 stores a control program. The CPU 371 executes the control program stored in the ROM 372 by using a temporary storage function of the RAM 373. The controller 37 thereby performs processes illustrated in FIGS. 3 through 6.

The controller 37 stores the communication performance index supplied from the wide area communicator 32 and the satellite signal quality index supplied from the position detector 33 as well as time points of storing in the subject vehicle storage area 36a of the storage unit 36. The controller 37 deletes a communication performance index and a satellite signal quality index expiring a predetermined retention time from communication performance indexes and satellite signal quality indexes stored in the subject vehicle storage area 36a of the storage unit 36. The retention time is short enough to be highly likely to cause an acceptable change in the communication performance index and the satellite signal quality index due to a change in the communication environment while the subject vehicle 2a is traveling. The retention time is predetermined based on experiments. All or part of the functions performed by the controller 37 may be configured as hardware by using one or more IC modules.

The notifier 38 is available as either or both of a display and a speaker and is used to notify an occupant of the subject vehicle 2a that the wide area communicator 32 is abnormal.

(Processes of the Controller 37)

Figure 3:
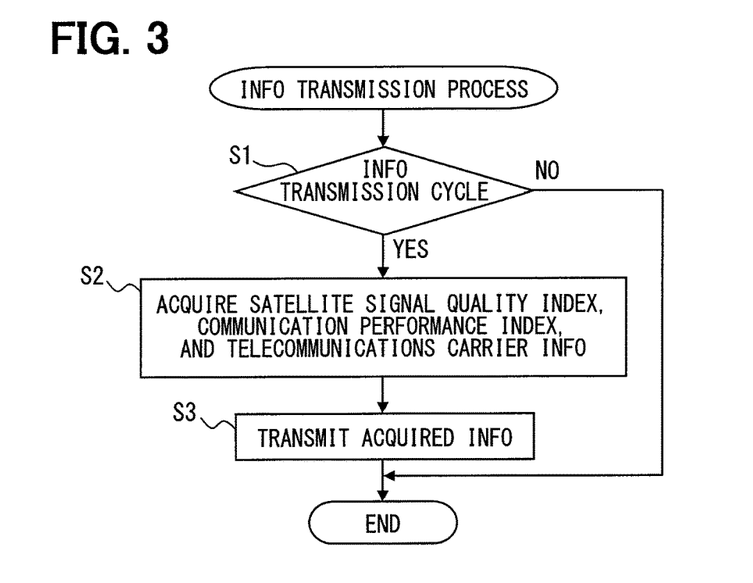
FIG. 3 is a flowchart illustrating an information transmission process performed by a controller in FIG. 2.
Figure 4:
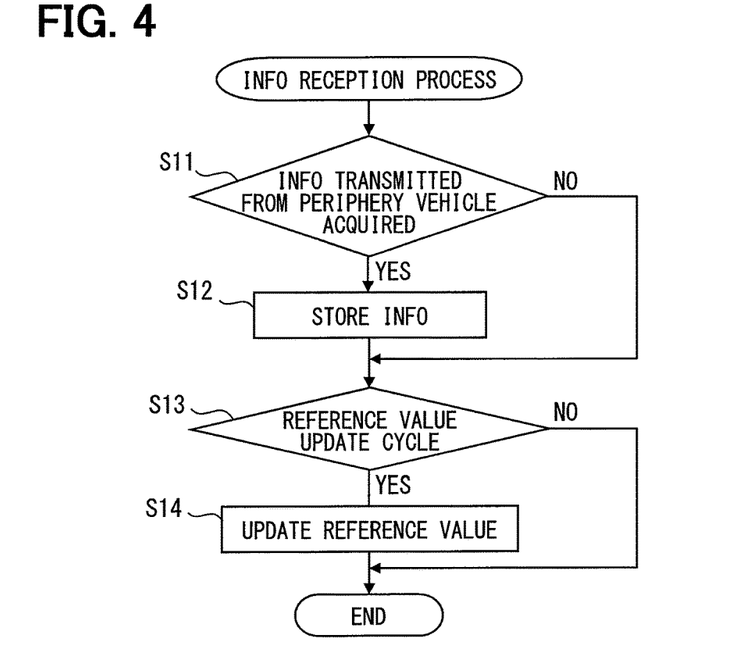
FIG. 4 is a flowchart illustrating an information reception process performed by the controller in FIG. 2.
Figure 5:
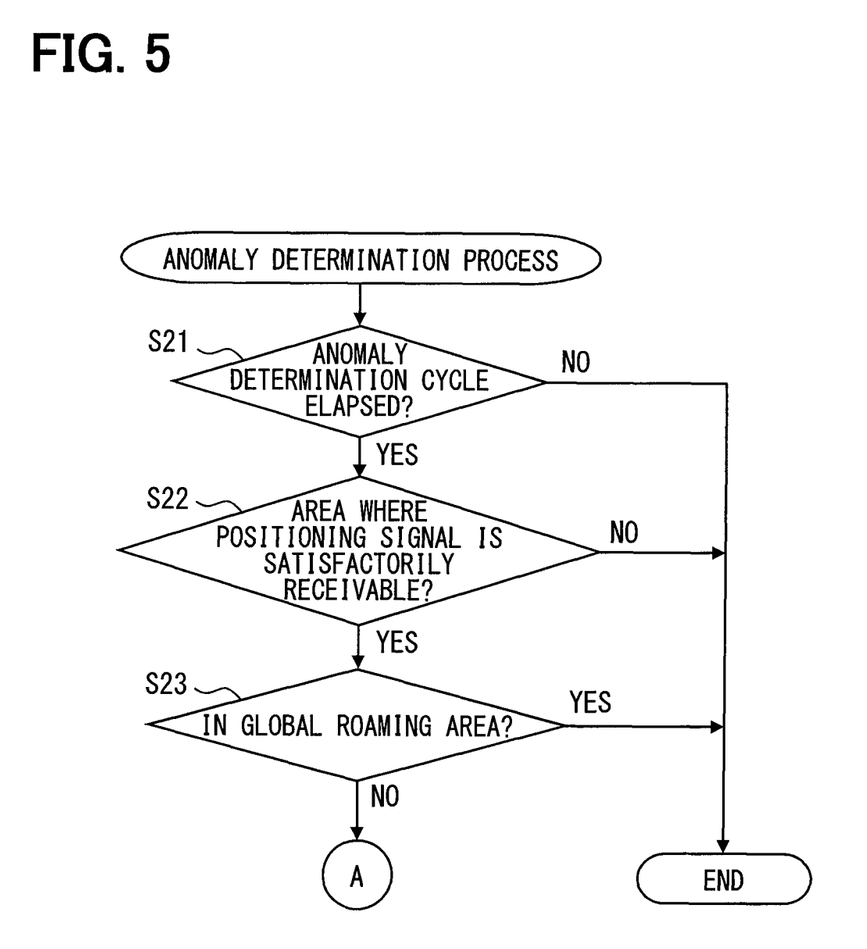
FIG. 5 is a flowchart illustrating an anomaly determination process performed by the controller in FIG. 2.

The controller 37, when powered on, performs processes illustrated in FIGS. 3 through 5 each at a corresponding predetermined cycle. The description below first explains an information transmission process in FIG. 3.

At step S1, it is determined whether an information transmission cycle is reached. The information transmission cycle ranges from one to several hundreds of milliseconds. The process in FIG. 3 terminates if the determination at step S1 results in NO. The process proceeds to step S2 if the determination results in YES.

At step S2, the most recent satellite signal quality index, the most recent communication performance index, and the telecommunications carrier information are acquired from the subject vehicle storage area 36a of the storage unit 36.

At step S3, the narrow area communicator 31 transmits, to the surrounding of the subject vehicle 2a, the most recent satellite signal quality index, the most recent communication performance index, and the telecommunications carrier information acquired at step S2 along with a vehicle ID of the subject vehicle 2a. The vehicle ID of the subject vehicle 2a is stored in a given storage unit such as the ROM 372. An ID of the in-vehicle device 3a can be used as the vehicle ID of the subject vehicle 2a. The narrow area communicator 31 uses a broadcast system as a transmission system, for example. However, the transmission system may use a unicast or multicast system that specifies the periphery vehicle 2b as an information transmission destination.

The description below explains an information reception process illustrated in FIG. 4. At step S11, it is determined whether information is transmitted from the in-vehicle device 3b mounted on the periphery vehicle 2b. Specifically, the periphery vehicle 2b performs step S3 in FIG. 3 as above and the narrow area communicator 31 of the in-vehicle device 3a receives the information. The narrow area communicator 31 then supplies the decoded data as above. At step S11, it is determined whether the decoded data is supplied from the narrow area communicator 31. The process directly proceeds to step S13 if the determination results in NO. The process proceeds to step S12 if the determination results in YES.

At step S12, the information acquired from the narrow area communicator 31 is stored in the periphery vehicle storage area 36b of the storage unit 36 along with the storing time point. The most recent information acquired from the narrow area communicator 31 is stored and information whose retention time expires is deleted.

The periphery vehicle 2b transmits the same type of information the subject vehicle 2a transmits at step S3 in FIG. 3. The information transmitted from the periphery vehicle 2b therefore includes the satellite signal quality index, the communication performance index, the telecommunications carrier information, and the vehicle ID of the periphery vehicle 2b.

Steps S13 and S14 correspond to a reference value setup section. At step S13, it is determined whether a reference value update cycle is reached. The reference value update cycle is predetermined and takes effect longer than or equal to an information transmission cycle. The process in FIG. 4 terminates if the determination results in NO. The process proceeds to S14 if the determination results in YES.

At step S14, the reference value is updated based on a reference value generation set, namely, the most recent communication performance index stored in the periphery vehicle storage area 36b of the storage unit 36 in terms of each periphery vehicle 2b. The reference value generation set may include the given number of communication performance indexes from the most recent one in addition to the most recent communication performance index. The reference value generation set may include communication performance indexes corresponding to a given time period from the most recent one.

No reference value is specified when the in-vehicle device 3a is powered. Thus, when S14 is performed for the first time after power on of the in-vehicle device 3a, the reference value is specified, not updated.

A specific reference value generated from the reference value generation set uses any one of an average value, a median value, and a mode value for communication performance indexes included in the reference value generation set. No reference value may be generated if the number of reference value generation sets is smaller than the minimum number of reference value generation sets to ensure the reliability of reference values. The minimum number is 2 or larger. Specifically, any numeric values are available. The reference value generation set may include the communication performance index for the subject vehicle 2a.

The description below explains an anomaly determination process illustrated in FIG. 5. At step S21, it is determined whether an anomaly determination cycle elapses from the previous anomaly determination or from the time to start a power-on sequence if the anomaly determination is not performed yet. The process in FIG. 5 terminates if the determination results in NO. The process proceeds to step S22 if the determination results in YES.

At step S22, it is determined whether the current area is capable of satisfactorily receiving a positioning signal. The determination uses the most recent satellite signal quality index that is stored in the periphery vehicle storage area 36b of the storage unit 36 in terms of each periphery vehicle 2b. The most recent satellite signal quality index is compared with a predetermined signal quality threshold value. The periphery vehicle 2b having transmitted the satellite signal quality index is assumed not to satisfactorily receive the positioning signal if the satellite signal quality index is smaller than the signal quality threshold value as a result of the comparison. The current area is assumed not to be capable of satisfactorily receiving the positioning signal if the number of or a ratio of periphery vehicles 2b incapable of satisfactorily receiving the positioning signal exceeds an unsuccessful reception determination threshold value. In this case, the determination at step S22 results in NO. The process in FIG. 5 terminates if the determination at step S22 results in NO.

The determination at step S22 results in YES and the process proceeds to S23 if the current area is determined to be capable of satisfactorily receiving the positioning signal.

In step S23 corresponding to a roaming determination section, it is determined whether the current position is located in a global roaming area. The determination is performed by comparing the telecommunications carrier information stored in the periphery vehicle storage area 36b of the storage unit 36 with telecommunications carrier information predetermined for each country. The current position is determined to be located in a global roaming area if the telecommunications carrier information stored in the periphery vehicle storage area 36b includes the telecommunications carrier information for multiple countries. The global roaming area changes the telecommunications carrier that manages the wide area communication network 6 to which the wide area communicator 32 connects. The global roaming area corresponds to a changeover area.

The determination at step S23 results in YES if the current position is located in the global roaming area. In this case, the process in FIG. 5 terminates. The determination at step S23 results in NO if the current position is determined not to be located in the global roaming area. In this case, the process proceeds to step S24 in FIG. 6.

Figure 6:
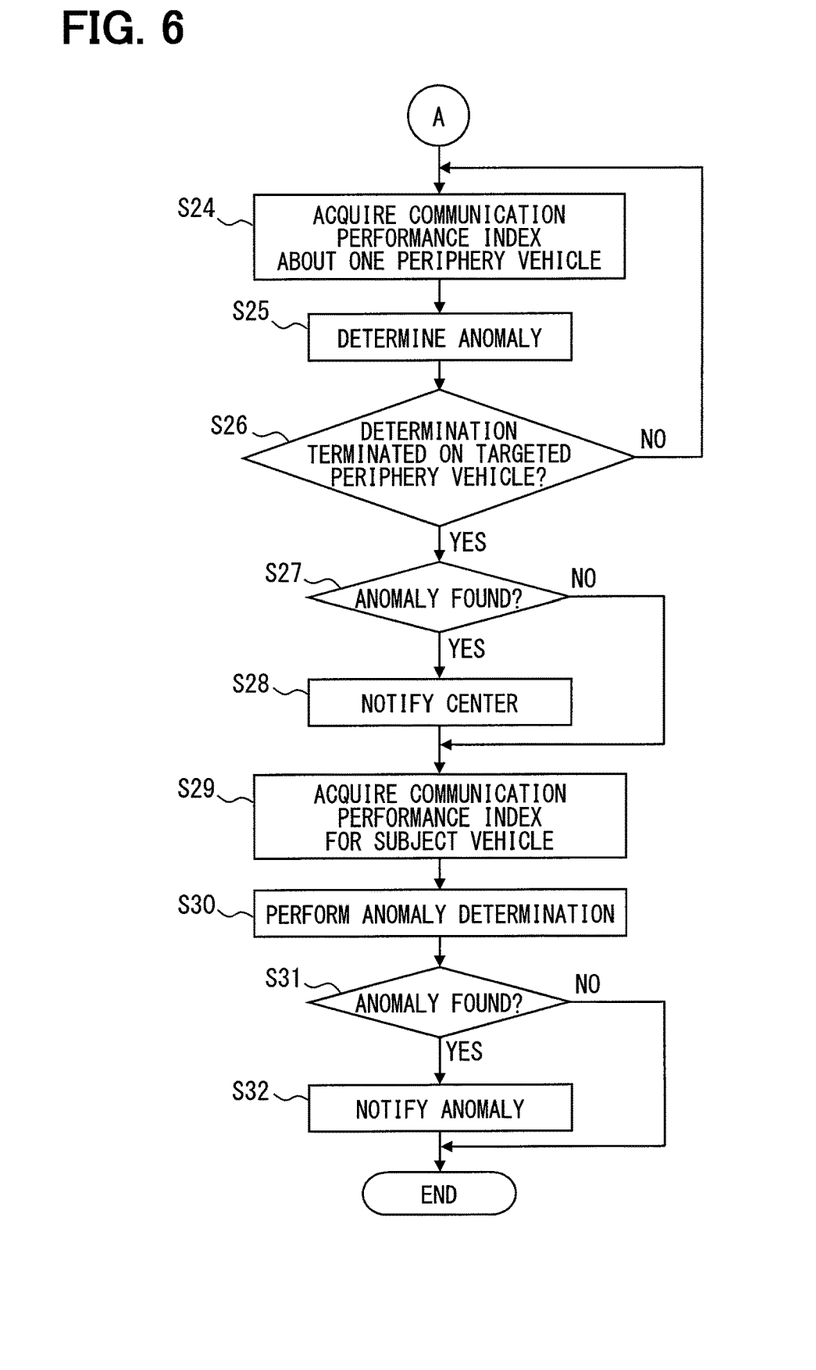
FIG. 6 is a flowchart illustrating the process performed by the controller following FIG. 5.

At step S24 as an acquisition section, the most recent communication performance index corresponding to the wide area communicator 32 of the periphery vehicle 2b targeted at the anomaly determination is acquired from the periphery vehicle storage area 36b of the storage unit 36.

A targeted wide area communicator represents the wide area communicator 32 of the periphery vehicle 2b when the wide area communicator 32 is targeted at the anomaly determination. The wide area communicator 32 of the periphery vehicle 2b targeted at the anomaly determination equals at least one of wide area communicators 32 for which the reference value generation set includes the communication performance index. In the description below, the wide area communicators 32 for which the reference value generation set includes the communication performance index are all assumed to be targeted wide area communicators 32.

At step S25 as an anomaly determination section, the communication performance index acquired at step S24 is compared with the reference value to determine whether the wide area communicator 32 corresponding to the communication performance index acquired at step S24 is abnormal.

The wide area communicator 32 of the periphery vehicle 2b transmitting the communication performance index is determined to be abnormal when an anomaly determination condition is satisfied as a result of the comparison between the communication performance index and the reference value. The anomaly determination condition is satisfied when a difference between the reference value and the communication performance index is larger than an anomaly determination threshold value predetermined for the difference, for example. The anomaly determination condition may be satisfied when a ratio between the reference value and the communication performance index exceeds an anomaly determination range predetermined for the ratio.

At step S26, it is determined whether the anomaly determination on the targeted wide area communicator 32 of the periphery vehicle 2b terminates. The process returns to step S24 if the determination results in NO. At step S24, in this case, the most recent communication performance index is acquired from the periphery vehicle storage area 36b of the storage unit 36 on condition that the communication performance index corresponds to the periphery vehicle 2b on which the anomaly determination is not yet performed.

The process proceeds to step S27 if the determination at step S26 results in YES. At step S27, it is determined whether the repetition from steps S24 through S26 determines the wide area communicator 32 to be abnormal. The process proceeds to step S29 if the determination results in NO. The process proceeds to step S28 if the determination results in YES.

At step S28 as a first anomaly notification processing section, the wide area communicator 32 of the subject vehicle 2a notifies the center 5 of a message signifying that the wide area communicator 32 of the periphery vehicle 2b determined to be abnormal is abnormal. Repeated notification is unneeded if the same contents are already notified to the center 5. The notification also includes the vehicle ID of the periphery vehicle 2b mounted with the wide area communicator 32 determined to be abnormal. The wide area communicator 32 of the subject vehicle 2a corresponds to a specified communicator.

At step S29 as the acquisition section, the targeted narrow area communicator is identified with the wide area communicator 32 of the subject vehicle 2*a*. The most recent communication performance index for the wide area communicator 32 of the subject vehicle 2*a* is acquired from the subject vehicle storage area 36*a* of the storage unit 36.

At step S30 as the anomaly determination section, the communication performance index acquired at step S29 is compared with the reference value and it is determined whether the wide area communicator 32 of the subject vehicle 2*a* is abnormal. The anomaly determination uses the same method as step S25.

At step S31, it is determined whether the wide area communicator 32 of the subject vehicle 2*a* is determined to be abnormal as a result of the anomaly determination at step S30. The process in FIG. 6 terminates if the determination results in NO. The process proceeds to step S32 if the determination results in YES.

At step S32 as a second anomaly notification processing section, the notifier 38 notifies that the wide area communicator 32 of the subject vehicle 2*a* is abnormal.

(Overview of the First Embodiment)

The configuration of the first embodiment uses the reference value generation set including a communication performance index acquired from the periphery vehicle 2*b* existing in the communication range for the narrow area communicator 31 of the subject vehicle 2*a*. The reference value is therefore settled from communication performance indexes included in the reference value generation set (S14).

The communication performance of the wide area communicator 32 dynamically varies because the in-vehicle device 3 is used for a vehicle as a movable object. However, multiple periphery vehicles 2*b* share a similar communication environment with each other. An influence of the communication environment may change the communication performance of the wide area communicator 32. In such a case, an influence of the communication environment also changes the reference value settled based on communication performance indexes acquired from the multiple periphery vehicles 2*b*. Even if the wide area communicator 32 is abnormal, the anomaly exercises little influence on the reference value because multiple communication performance indexes are used. The reference value is therefore assumed to vary with the communication environment.

The reference value is compared with communication performance index for the wide area communicator 32 to determine an anomaly in the wide area communicator 32 of the periphery vehicle 2*b* (S25). A difference between the reference value and the communication performance index is therefore large when the communication performance index for the wide area communicator 32 of the periphery vehicle 2*b* indicates an abnormal value due to an anomaly of the wide area communicator 32. A difference between the reference value and the communication performance index is not large when the wide area communicator 32 of the periphery vehicle 2*b* is not abnormal but the communication performance index indicates an abnormal value due to an influence of the communication environment.

It is possible to accurately distinguish between the case where the wide area communicator 32 of the periphery vehicle 2*b* is abnormal and the case where an influence of the communication environment causes an abnormal value from the communication performance index for the wide area communicator 32. It is therefore possible to accurately determine anomaly of the wide area communicator 32 of the periphery vehicle 2*b*.

The reference value is also used to determine anomaly of the wide area communicator 32 of the subject vehicle 2*a*. Anomaly on the wide area communicator 32 of the subject vehicle 2*a* is determined by comparing the reference value with the communication performance index for the wide area communicator 32 of the subject vehicle 2*a* (S30). It is possible to accurately distinguish between the case where the wide area communicator 32 of the subject vehicle 2*a* is abnormal and the case where an influence of the communication environment causes an abnormal value from the communication performance index for the wide area communicator 32 of the subject vehicle 2*a* for the same reason as the above-mentioned anomaly determination on the wide area communicator 32 of the periphery vehicle 2*b*. It is therefore possible to accurately determine anomaly of the wide area communicator 32 of the subject vehicle 2*a*.

Particularly, the present embodiment does not perform the anomaly determination on the wide area communicator 32 when the area cannot satisfactorily receive a positioning signal (S22: NO). The positioning signal greatly degrades its communication performance in a tunnel similarly to the communication of the wide area communicator 32. The reliability of the reference value is also highly likely to degrade in an area that cannot satisfactorily receive a positioning signal. It is therefore possible to suppress accuracy degradation in the anomaly determination by avoiding the anomaly determination on the wide area communicator 32 outside an area capable of satisfactorily receiving a positioning signal.

The present embodiment does not perform the anomaly determination on the wide area communicator 32 when located in a global roaming area (S23: YES). In the global roaming area, the wide area communicator 32 in the in-vehicle device 3*b* mounted on multiple periphery vehicles 2*b* is likely to perform a process that changes the wide area communication network 6 for connection to the wide area communication network 6 managed by a different telecommunications carrier. The communication performance temporarily degrades while this process is performed. All the periphery vehicles 2*b* do not perform the process to change the wide area communication network 6 even in the global roaming area. Some periphery vehicles 2*b* temporarily degrade the communication performance, but others do not in the global roaming area. The reference value is therefore likely to be instable. It is therefore possible to suppress accuracy degradation in the anomaly determination by avoiding the anomaly determination on the wide area communicator 32 in the global roaming area.

Normally, the wide area communicator 32 is used for communication with the center 5. The wide area communicator 32, if abnormal, makes notification to the center 5 difficult. It is therefore difficult for the periphery vehicle 2*b* including the abnormal wide area communicator 32 to notify the center 5 that the wide area communicator 32 of the periphery vehicle 2*b* is abnormal.

However, the present embodiment determines that the wide area communicator 32 of the periphery vehicle 2*b* is abnormal (S27: YES). In this case, the wide area communicator 32 of the subject vehicle 2*a* notifies the center 5 of the vehicle ID of the periphery vehicle 2*b* determined to be abnormal along with a message signifying that the wide area communicator 32 is abnormal (S28). The present embodiment can therefore notify the center 5 that the wide area communicator 32 is abnormal even if the wide area communicator 32 is abnormal. The center 5 can perform a process to temporarily stop a wide area communication service, when notified that the wide area communicator 32 is abnormal.

The present embodiment determines that the wide area communicator 32 of the subject vehicle 2*a* is abnormal (S31:

YES). In this case, the notifier 38 notifies that the wide area communicator 32 is abnormal (S32). An occupant of the subject vehicle 2a can recognize that the wide area communicator 32 of the subject vehicle 2a is abnormal. The occupant can use a communicator other than the wide area communicator 32 such as a mobile telephone carried by the occupant to notify the center 5 that the wide area communicator 32 of the subject vehicle 2a is abnormal.

While the embodiment has been illustrated, the embodiment is not limited to the above-mentioned and can be variously modified. The embodiment is also applicable to the modifications described below. The description below includes an element assigned the same reference numeral as that used hitherto. Except as otherwise noted, such element equals the element that is assigned the same reference numeral and is described in the above-mentioned embodiment. A configuration may be described only partially. In such a case, the above-mentioned embodiment is applicable to the remaining part of the configuration.

<First Modification>

The above-mentioned embodiment determines an anomaly on the wide area communicator 32 of the subject vehicle 2a (S26, S27) and the wide area communicator 32 of the subject vehicle 2b (S21 through S23). However, anomaly may be determined on one of the wide area communicator 32 of the subject vehicle 2a and the wide area communicator 32 of the subject vehicle 2b.

<Second Modification>

In the above-mentioned embodiment, the subject vehicle 2a and the periphery vehicle 2b are mounted with the same in-vehicle device 3. The controller 37 of the in-vehicle device 3 in each of the subject vehicle 2a and the periphery vehicle 2b therefore performs the information transmission process (FIG. 3), the information reception process (FIG. 4), and the anomaly determination process (FIGS. 5 and 6). However, the subject vehicle 2a need not perform the information transmission process (FIG. 3) so that the in-vehicle device 3 of the subject vehicle 2a determines an anomaly on the wide area communicator 32 of the subject vehicle 2a and the periphery vehicle 2b. The periphery vehicle 2b need not perform the information reception process (FIG. 4) and the anomaly determination process (FIG. 5). The controller 37 of the in-vehicle device 3 in the subject vehicle 2a therefore may not perform the information transmission process (FIG. 3). The in-vehicle device 3 of the periphery vehicle 2b may not perform the information reception process (FIG. 4) and the anomaly determination process (FIG. 5).

<Third Modification>

The above-mentioned embodiment uses the narrow area communicator 31 to transmit the satellite signal quality index, the communication performance index, the present telecommunications carrier information, and the vehicle ID (S3). However, the wide area communicator 32 may be used to transmit the communication performance index and the others. In this case, the wide area communicator 32 also transmits the current position.

The wide area communicator 32 receives the communication performance index and the others when the wide area communicator 32 is used to transmit the communication performance index and the others. The wide area communicator 32 functions as a reception section. The wide area communicator 32 receives the communication performance index and the others from the vehicles other than the periphery vehicle 2b when the wide area communicator 32 transmits and receives the communication performance index and the others. However, the communication performance index from the periphery vehicle 2b can be isolated from communication performance indexes received by the wide area communicator 32 based on the current position received along with the communication performance index and the current position of the subject vehicle 2a. The wide area communicator 32 may therefore transmit and receive the communication performance index.

<Fourth Modification>

The position detector 33 may include an acceleration sensor and a gyro sensor in addition to the GNSS receiver so as to be capable of autonomous navigation when an electromagnetic wave is unsatisfactorily received from a positioning satellite.

<Fifth Modification>

Figure 7:
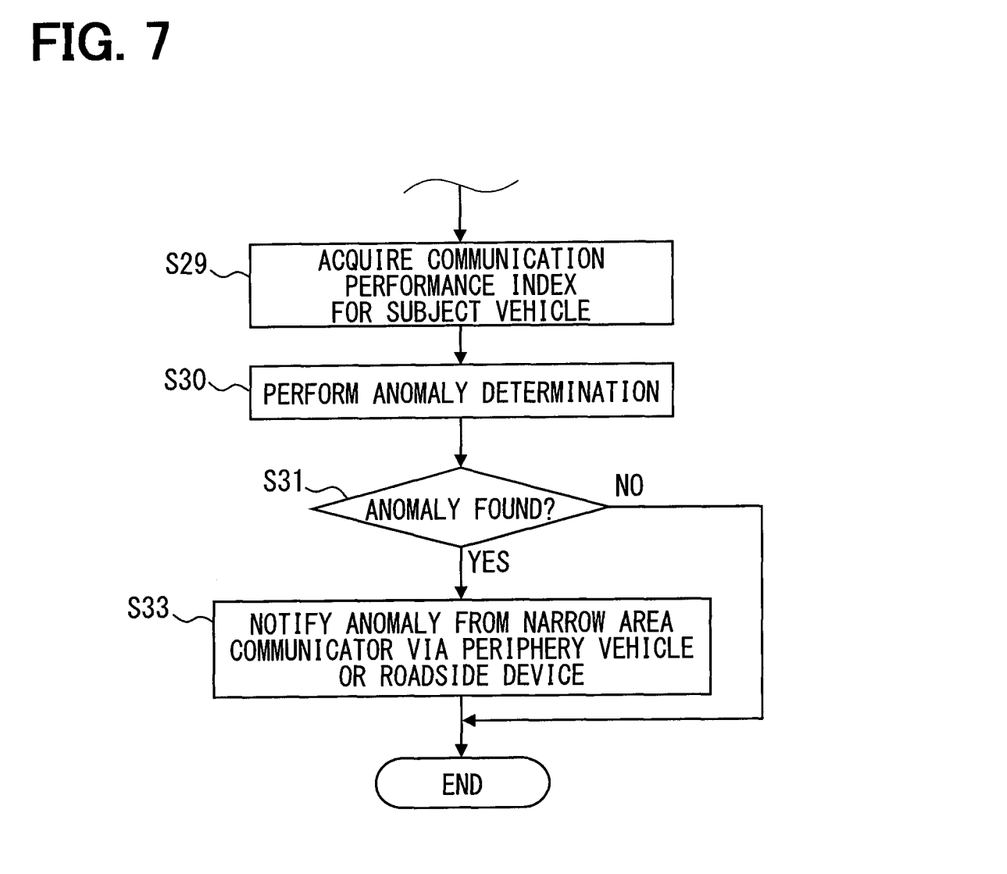
FIG. 7 is a flowchart illustrating part of an anomaly determination process performed by the controller according to a fifth modification.

As illustrated in FIG. 7, it may be determined that the wide area communicator 32 of the subject vehicle 2a is abnormal (S31: YES). In this case, the narrow area communicator 31 of the subject vehicle 2a may transmit request information to the narrow area communicator 31 mounted on the periphery vehicle 2b or to the roadside device 4 (S33). The request information notifies the center 5 that the wide area communicator 32 of the subject vehicle 2a is abnormal. Step S33 corresponds to a third anomaly notification processing section. The narrow area communicator 31 of the subject vehicle 2a may not be able to communicate with the narrow area communicator 31 of the periphery vehicle 2b and the roadside device 4 because the periphery vehicle 2b and the roadside device 4 are unavailable nearby. In such a case, a possible solution is to wait for a situation that enables communication with the periphery vehicle 2b or the roadside device 4.

<Sixth Modification>

Similarly to step S33 in FIG. 7, the narrow area communicator 31 of the subject vehicle 2a may be used when the in-vehicle device 3a of the subject vehicle 2a notifies the center 5 that the wide area communicator 32 of the periphery vehicle 2b is abnormal. In this case, the narrow area communicator 31 corresponds to a specified communicator.

<Seventh Modification>

The above-mentioned embodiment causes the targeted wide area communicator to represent all the wide area communicator 32 whose reference value generation set includes the communication performance index. This embodiment is not limiting. The targeted wide area communicator may represent the predetermined number of wide area communicators 32 sequentially from the one nearest to the subject vehicle 2a out of wide area communicators 32 whose reference value generation set includes the communication performance index.

<Eighth Modification>

The controller 37 may include a function as a baseband section that processes baseband signals included in electromagnetic waves transmitted and received by the wide area communicator 32. In this case, the controller 37 specifies the communication performance index.

<Ninth Modification>

It may not be necessary to cyclically transmit the communication performance index. The communication performance index may be transmitted at the time when the narrow area communicator 31 starts communication with the roadside device 4.

<Tenth Modification>

In the above-mentioned embodiment, the communication performance index corresponds to one of the RSSI, the average communication rate, the communication success rate, and the number of received error frames. The communication performance index may use two or more of these.

In this case, the reference value is also specified for a respective communication performance index. The reference value is also compared with the communication performance index to determine an anomaly for a respective communication performance index. The anomaly determination performed for a respective communication performance index may result in the given number of communication performance indexes that satisfy an anomaly determination condition. The wide area communicator 32 corresponding to the communication performance index is then determined to be abnormal.

What is claimed is:

1. A vehicular communication device used for a vehicle, comprising:
    a reception section that, from a periphery vehicle equipped with a wide area communicator to connect a wide area communication network for performing communication, receives a communication performance index representing performance of the wide area communicator;
    a reference value setup section that successively settles a reference value as a criterion for the communication performance index based on the communication performance indexes received by the reception section from a plurality of the periphery vehicles;
    an acquisition section that acquires the communication performance index for a targeted wide area communicator, wherein a targeted wide area communicator is the wide area communicator targeted at anomaly determination; and
    an anomaly determination section that determines an anomaly of the targeted wide area communicator based on comparison between the reference value settled by the reference value setup section and the communication performance index acquired by the acquisition section for the targeted wide area communicator.

2. The vehicular communication device according to claim 1, wherein:
    the acquisition section acquires any of the communication performance indexes acquired by the reception section from a plurality of the periphery vehicles as the communication performance index for the targeted wide area communicator.

3. The vehicular communication device according to claim 1, wherein:
    the vehicular communication device includes the wide area communicator; and
    the acquisition section acquires, as the communication performance index for the targeted wide area communicator, the communication performance index for the wide area communicator that is included in the sane vehicular communication device as the acquisition section is included.

4. The vehicular communication device according to claim 2, further comprising:
    a first anomaly notification processing section that, when the anomaly determination section determines that the targeted wide area communicator is abnormal, uses a specified communicator to notify a center that the wide area communicator of the periphery vehicle serving as the targeted wide area communicator is abnormal.

5. The vehicular communication device according to claim 3, further comprising:
    a notifier that notifies information to an occupant of the vehicle; and
    a second anomaly notification processing section that, when the anomaly determination section determines that the targeted wide area communicator is abnormal, causes the notifier to notify that there is the anomaly in the wide area communicator of a subject vehicle serving as the vehicle including the targeted wide area communicator.

6. The vehicular communication device according to claim 3, wherein
    the vehicular communication device includes:
    a narrow area communicator that communicates with at least one of the periphery vehicle and a roadside device; and
    a third anomaly notification processing section that, when the anomaly determination section determines that the targeted wide area communicator is abnormal, causes the narrow area communicator to transmit a request notifying a center that the wide area communicator of a subject vehicle serving as the vehicle including the targeted wide area communicator is abnormal.

7. The vehicular communication device according to claim 1, wherein:
    the reception section receives positioning result information in addition to the communication performance index, the positioning result information being specified based on a positioning signal the periphery vehicle having transmitted the communication performance index receives from a positioning satellite; and
    when the positioning result information received from the plurality of periphery vehicles indicates that the positioning signal cannot be satisfactorily received from the positioning satellite, the anomaly determination section does not perform anomaly determination on the targeted wide area communicator.

8. The vehicular communication device according to claim 1, wherein
    the reception section receives telecommunications carrier information in addition to the communication performance index, the telecommunications carrier information indicating a telecommunications carrier to which the wide area communicator is connected,
    the vehicular communication device further comprising
    a roaming determination section that determines whether to be located in a changeover area that changes a telecommunications carrier used by the wide area communicator, based on the telecommunications carrier information received by the reception section,
    wherein
    when the roaming determination section determines the changeover area, the anomaly determination section does not perform anomaly determination on the targeted wide area communicator.

* * * * *